United States Patent Office 3,342,584
Patented Sept. 19, 1967

3,342,584
METHOD FOR KILLING BROADLEAF AND GRASSY WEEDS IN COTTON
Robert C. Harnden, Memphis, Tenn., and John O. Moore, West Helena, Ark., assignors, by mesne assignments, to The Ansul Company, a corporation of Wisconsin
No Drawing. Filed July 10, 1963, Ser. No. 294,188
16 Claims. (Cl. 71—97)

This invention relates to improvements in weed control, and more particularly to compositions and methods for controlling weeds in cotton fields.

Cultivation of cotton is a time-consuming and exacting process which is greatly hampered by weed growth.

In an effort to control weeds in cotton fields, the planter generally resorts to conventional pre-emergent and post emergent herbicides, burning, and mechanical cultivation, e.g., hand hoeing.

In spite of use of all of these means, however, weed control in cotton fields has remained extremely troublesome, and in some situations the weed problem gets so out of hand that soil sterilants have to be applied, thereby killing both weeds and desired crop in an effort to gain control of the weeds and obtain a crop the following year.

Typical of weeds which proliferate in cotton fields are broadleaf weeds such as pigweed, cocklebur, trumpet vine, ragweed, morning glory and the like. Annual grasses such as Dallis grass, witch grass and barnyard grass are troublesome, and the perennial Johnson grass is perhaps the most difficult of all to cope with.

It is an object of this invention to provide a herbicide and a method for its use for the control in cotton fields of broadleaf and grassy weeds of the type described.

It is a further object of this invention to provide herbicidal compositions which can be applied through over-the-top or broadcast spray application to weeds and grasses of the type described in cotton fields.

It is another object of this invention to provide herbicidal compositions and treatments for the simultaneous control of broadleaf and grassy weeds of the type described.

Other objects and advantages of the invention will in part be obvious and will in part appear hereinafter.

According to the present invention, it has been discovered that cotton is resistant to attack by organic arsonic acids and derivatives of such acids possessing effective herbicidal activity, and that weeds and grasses of the type described can be effectively controlled in cotton fields by application of arsonic acids or salts thereof in amounts and at rates high enough to kill the weeds and grasses, but low enough to prevent substantial injury to the cotton plants.

The arsonic acids particularly suitable for use correspond to the structural formula:

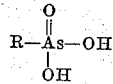

wherein R is an aliphatic radical of the alkane, alkene, or alkyne series, i.e., saturated or unsaturated, having less than 10 and preferably less than 5 carbon atoms in the aliphatic chain.

The preferred arsonic acids are those in which R is an aliphatic radical of the alkane series, such as methyl, ethyl, propyl, butyl, and the like.

It will be apparent from the structural formula that one or both of the hydrogen atoms of arsonic acids may be replaced to form mono- or di-arsonates. Although the di-arsonate salts are preferred, the mono- salts may also be employed. Typical of the salts which may be used are the inorganic salts, among which may be mentioned alkali metal salts, such as sodium, potassium, lithium and the like; and the alkaline earth metal salts, such as calcium, barium, magnesium, and the like. Also may be mentioned the ammonium, manganese, iron, cobalt, cadmium, aluminum, zinc, lead and nickel salts.

Among the inorganic salts of arsonic acids, disodium methanearsonate, sometimes referred to hereinafter as DSMA, is preferred.

Organic salts of arsonic acid, such as the ethanolamine and morpholine salts, may also be used.

The arsonic acid compounds may be used alone, but for best results are combined with surfactants to render them particularly effective in control of weeds commonly found in cotton fields. Preferred for use as the surfactant are the polyoxyalkylene thioethers, such as those sold under the trade names Sterox 6 and Sterox SK. Also suitable for use are certain anionic surfactants, among which may be mentioned alkyl aryl sulfonates, e.g., alkyl benzene sodium sulfonate sold under the trade name Ultra Wet-K. Other anionic surfactants giving particularly good results when used with the arsonic acid compounds described herein are sulfamides derived from N-methyltaurine or N-cyclohexyltaurine and fatty acids (e.g., "Igepon" T and C types).

The amount of surfactant employed will vary from about 0.1 to about 5 percent, preferably 0.25 to 1 percent, by weight of the total herbicidal solution or composition. The actual concentration employed will generally vary inversely with the quantity of water or carrier.

The herbicidal compositions described herein will ordinarily be applied in an aqueous solution. Dry powders may also be employed, however, as will be made more clear hereinbelow.

In any event, when applying the herbicide to the plants to be treated, it is essential that good coverage of the foliage be obtained.

In some cases, as in applying an aqueous solution from an airplane, as little as ten gallons per acre may be employed, but usually 40 to 50 gallons will be applied and occasionally 100 gallons can be advantageously employed.

The spray may be applied broadcast or as a directed spray to the bands containing the desirable crops. Superior performance has been obtained when the spray was made up of small drops from a pressure nozzle rather than when applied from a flooding tip.

In general, the organic arsonic acids and their salts should be applied in a quantity at least about 0.5 and preferably about 2 or between 2 and 15 pounds of active chemical per acre of cropland being treated.

The manner in which the invention is to be carried out will be made more clear by reference to the following examples which are intended to be illustrative rather than limiting:

*Example 1*

A herbicidal spray was applied to a field of cotton in St. Francis County, Ark., which was infested with weeds, among them Johnson grass, pigweed, cocklebur and others. The herbicidal spray contained 3 pounds of commercial DSMA sold under the trade name ANSAR (equivalent to 1.9 pounds of anhydrous disodium methanearsonate) and 40 gallons of water, and was applied to the field in over-the-top fashion under hot, dry conditions. The results reported in Table I were observed approximately one week after application of the herbicide.

TABLE I

| Treatment No. | 1 | 2 | 3 | 4 |
|---|---|---|---|---|
| Anhydrous DSMA, lbs./acre | 1.9 | 1.9 | 1.9 | 1.9 |
| Non-ionic surfactant, percent by wt | 0 | 0.5 | 0.5 | 0.75 |
| Weed control:[1] | | | | |
| Crabgrass | | | | 9 |
| Johnson grass | 4 | 10 | 9 | 10 |
| Pigweed | 0 | 5 | 6 | 9 |
| Cocklebur | 5 | 9 | 10 | 9 |
| Morning glory | | | | 10 |

[1] 0=no effect; 10=complete kill.

The non-ionic surface active agent employed in this and the other examples was described hereinabove as Sterox 6.

The treatment produced a redness on the stems of the cotton plants and a slight stunting of the leaves but all the plants recovered within a few days and there was no apparent loss in yield. The increase in activity produced by the surfactant is evident in treatment Nos. 2, 3 and 4.

The action of the arsonic acid compounds, it was observed, is particularly effective when the weeds and grasses to be controlled are healthy and growing rapidly.

*Example 2*

A field of Deltapine smooth leaved cotton located near Indianola, Miss., was badly infested with the weeds shown in Table II. In August when the cotton was maturing, well bolled and approximately 5' in height, the field was treated with herbicidal solution at the rate of 50 gallons per acre applied in over-the-top spray. The solution contained 0.5 percent by weight surfactant and the amounts of disodium methanearsonate indicated in Table II. The herbicide was prepared from a commercial grade of disodium methanearsonate containing 63 percent active material on an anhydrous basis and about 27 percent sodium chloride. From the results in Table II, it is evident that about 1.57 pounds per acre of disodium methanearsonate are the minimum to control the weeds present, although treatment No. 11 obviously did reduce their vigor. The major effect of the increased concentration of treatment No. 13 and No. 14 was that the herbicidal effect took place more rapidly.

TABLE II

| Treatment No. | 11 | 12 | 13 | 14 |
|---|---|---|---|---|
| Anhydrous DSMA, lbs./acre | 0.79 | 1.57 | 3.78 | 7.55 |
| Non-ionic surfactant, percent by wt | 0.5 | 0.5 | 0.5 | 0.5 |
| Weed control:[1] | | | | |
| Johnson grass | 6 | 9 | 9 | 9 |
| Pigweed | 6 | 8 | 8 | 8 |
| Cocklebur | 8 | 9 | 9 | 9 |
| Morning glory | 7 | 9 | 9 | 9 |
| Goose grass | 7 | | 9 | 8 |
| Red vine | 4 | 8 | 8 | 8 |
| Wild potato | 7 | 8 | 8 | 8 |
| Cotton | 0 | 0 | 0 | 0 |

[1] 0=no effect; 10=complete kill.

When the field was observed approximately 30 days after treatment it was obvious that treatments Nos. 12, 13 and 14 had given a good practical kill on all weed species present.

Although the herbicidal composition of this invention may be applied to the plants as a dust or as an emulsion, the preferred method is in the form of a water solution which makes the active ingredients more immediately available to the plant. However, for ease in measuring and for economy in shipping and storage, a powdered concentrate is frequently convenient. Such a dry powder concentrate may be prepared as follows.

*Example 3*

1440 pounds of ANSAR DSMA (a special material containing 63 percent anhydrous disodium methanearsonate, 27 percent sodium chloride, the balance water and minor impurities) were placed in a ribbon mixer and sprayed with 1000 pounds of Sterox 6. Mixing was continued until the mixture was uniform and free of lumps which usually required about 10 minutes or slightly longer. At this time 1560 pounds of 325 mesh Attaclay was added and mixing continued for an additional 15 minutes to disperse the material completely. The product was a dry, free flowing powder stable in storage for prolonged periods. In place of Attaclay, any of the well known inert, finely divided, solid diluents known to this art may be used.

For controlling weeds in cotton, 10 pounds of the mixture of Example 3 was added to 60 gallons of water and mixed thoroughly. It was applied to the field at the rate of 60 gallons of solution per acre actually treated with results similar to those shown in Examples 1 and 2.

Compositions prepared in accordance with Example 3 and containing the following proportions of ingredients are especially suitable concentrates for use in controlling weeds in cotton fields as described herein:

| | Weight percent |
|---|---|
| Anhydrous disodium methanearsonate | 15 to 25 |
| Non-ionic surfactant | 5 to 30 |
| Sodium chloride | 5 to 15 |
| Inert solid diluent | Remainder |

In some situations, it has been found desirable to augment the action of the organic arsonates by the application of a small amount of another supplemental herbicide. Thus it has been discovered that weeds which have been weakened or "stressed" by the application of organic arsonates, particularly when a surfactant is employed, are more susceptible to the action of certain herbicides, which, by themselves, would not be effective to control such weeds.

The supplemental herbicides to be used in combination with the organic arsonic compounds to produce the results described are 2,2 dichloropropionic acid and its salts, trichloroacetic acid and its salts, monuron [(3-p-chlorophenyl)-1, 1-dimethylurea], diuron (3-(3,4-dichlorophenyl)-1, 1-dimethylurea), amitrole (3-amino-1,2,4-triazole), and so forth.

When the supplemental herbicides are applied they should be employed at a rate of at least about 0.1 pound to about 3.0 pounds and preferably about 0.25 to 1.0 pound of active herbicide per acre. It is especially important to avoid applying the supplemental herbicides described at excessive rates because they disappear slowly from the soil and their long residual effect may adversely affect the cotton, sometimes even during the following growing season.

Since the cotton is basically unaffected by the application of the organic arsonates, its use in combination with the described supplemental herbicides has the effect of increasing the activity of the supplemental herbicides. The supplemental herbicide may be applied subsequent to the arsonate treatment or simultaneously with it.

The following example is illustrative of the embodiment of the invention wherein the organic arsonic acid compound is supplemented by an additional herbicide.

*Example 4*

The numerical rating system used in this example is the same as that described in the preceding examples.

Fields of cotton in Arkansas and Mississippi containing numerous weeds were treated with 40 gallons per acre of a solution of disodium methanearsonate and Diuron in the amounts shown in Table IV. The results reported in Table IV were observed 5–10 days following the application. It will be noted that a wide variety of both grassy and broadleaf weeds were severely damaged by this combination treatment. There was a slight yellowing on certain leaves of the cotton immediately following treatment but the cotton recovered quickly.

TABLE IV

| Treatment No. | 21 | 22 | 23 | 24 | 25 | 26 | 27 | 28 |
|---|---|---|---|---|---|---|---|---|
| Anhydrous disodium methanearsonate, lbs./acre | 0 | 1.57 | 1.57 | 1.57 | 1.57 | 1.9 | 1.9 | 1.9 |
| Non-ionic surfactant, percent by wt. | 0 | 0.5 | 0.5 | 0.5 | 0.5 | 0.5 | 0.5 | 0.75 |
| Diuron, lbs./acre | 1 | 0.3 | 0.5 | 0.5 | 0.5 | .25 | 0.5 | 0.5 |
| Crabgrass | 3 | 9 | 9.9 | 9.5 | 9.5 | 9.5 | 9.5 | 9.5 |
| Johnson grass | | | | 5.0 | 7 | 6.0 | | 9.5 |
| Pigweed | | | | | 9 | | | 9.5 |
| Cocklebur | 4 | 9.5 | 9.9 | 9.5 | | 8 | 9.5 | 9.5 |
| Nut grass | | 10.0 | 9.9 | 9.5 | 10 | 8 | 9.5 | 9.5 |
| Ragweed | | | | 8.0 | 8 | | | 8 |
| Trumpet vine | 4 | 9.0 | | | | | | |
| Morning glory | | | | 5.0 | | | | |
| Goose grass | 3 | 9.0 | 9.9 | 9.5 | 10 | 9.5 | 9.5 | 9.5 |
| Water grass | 1 | | | | 9 | | | |
| Tie vine | 1 | | | 9.5 | 9 | | 9.5 | |
| Cotton | | | | 2.0 | | | | |
| | 0 | 0 | 0 | 0 | 0 | 0 | 0 | 0 |

The Diuron by itself, treatment No. 21, was relatively ineffective. A higher application rate for this herbicide is not advisable because of its great residual effect on the soil. When used with disodium methanearsonate, however, especially at the higher rates as in treatments Nos. 26, 27 and 28, the weeds were nearly totally eliminated.

The supplemental herbicides described herein may be admixed with the arsonic acid compounds to provide new and useful compositions particularly suitable for controlling weeds in cotton fields, as will be clear from the foregoing. If desired, the surfactants described herein may also form part of the combination of ingredients of such compositions.

In addition to controlling weeds in cotton fields, such compositions would also find application for general weed control, since they possess, as a unique property, the ability to simultaneously destroy both broadleaf and grassy weeds.

The invention in its broader aspects is not limited to the specific details shown and described, but departures may be made therefrom within the scope of the accompanying claims without departing from the principles of the invention and without sacrificing its chief advantages.

What is claimed is:

1. A method for killing broadleaf and grassy weeds in areas containing such weeds and cotton plants which comprises applying to said areas and contacting said broadleaf and grassy weeds and said cotton plants with a phytotoxic amount with respect to said weeds and non injurious amount with respect to said cotton plants of a composition comprising as an active herbicidal ingredient an arsonic acid compound selected from the group of compounds corresponding to the structural formula:

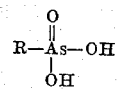

wherein R is an aliphatic radical containing 1 to 5 carbon atoms, and salts of said compounds and wherein at least one of the hydrogen atoms in said formula is replaced by a member selected from the group consisting of sodium, potassium, lithium, calcium, barium, magnesium, iron, cobalt, cadmium, aluminum, zinc, lead, nickel, ammonium ethanolamine and morpholine, and mixtures of the foregoing.

2. The method of claim 1 wherein enough of said composition is applied to provide between about 0.79 and 3.78 pounds of said arsonic acid compound per acre.

3. A method for killing broadleaf and grassy weeds in areas containing such weeds and cotton plants which comprises applying to said areas and contacting said broadleaf and grassy weeds and said cotton plants with a phytotoxic amount with respect to said weeds and non injurious amount with respect to said cotton plants of a composition comprising as an active herbicidal ingredient monosodium methanearsonate.

4. A method for killing broadleaf and grassy weeds in areas containing such weeds and cotton plants which comprises applying to said areas and contacting said broadleaf and grassy weeds and said cotton plants with a phytotoxic amount with respect to said weeds and non injurious amount with respect to said cotton plants of a composition comprising as an active herbicidal ingredient disodium methanearsonate.

5. A method of killing broadleaf and grassy weeds in areas containing such weeds and living cotton plants which comprises contacting said weeds and said cotton plants with, in combination, a surfactant, and, as the active herbicidal ingredient, a member selected from the group consisting of mono lower alkyl arsonic acids and alkali metal salts of mono lower alkyl arsonic acids, the amount of herbicidal ingredient being a sufficient phytotoxic amount to kill the weeds but insufficient to substantially injure the cotton.

6. A process for killing broadleaf and grassy weeds in areas containing such weeds and cotton plants while not damaging the cotton plants which comprises contacting said weeds and cotton plants with a phytotoxic amount of a composition comprising an alkali metal salt of a mono aliphatic alkane arsonic acid, said alkane containing 1–5 carbon atoms, and mixtures thereof, sufficient to kill said weeds but not in a sufficient amount to damage said cotton.

7. A process for destroying grassy weeds and broadleaf weeds in an area containing said weeds and cotton plants while not damaging said cotton plants which comprises applying to said area a phytotoxic amount of a composition containing a compound which is a member selected from the group consisting of methanearsonic acid, monosodium methanearsonate, disodium methanearsonate and mixtures thereof sufficient to destroy said grassy weeds and broadleaf weeds but not in a sufficient amount to effectively damage said cotton plants.

8. The process of claim 7, wherein said compound is applied at a rate of 1.57 to 3.78 lbs. per acre.

9. A process for selectively destroying grassy weeds in an area containing cotton plants while not effectively damaging the cotton plants which comprises contacting the cotton and grassy weeds with a phytotoxic amount with respect to said weeds of a composition comprising a compound which is a member selected from the group consisting of methanearsonic acid, monosodium methanearsonate and disodium methanearsonate and mixtures thereof, the amount of said composition being sufficient to destroy said weeds but not sufficient to effectively damage said cotton.

10. A process for selectively destroying broadleaf weeds in areas containing said weeds and cotton plants while not damaging said cotton plants which comprises applying to said areas a phytotoxic amount with respect to said weeds of a composition comprising a compound which is a member selected from the group consisting of methanearsonic acid, monosodium methanearsonate, disodium methanearsonate and mixtures thereof, said composition being applied in an amount sufficient to destroy said weeds but not sufficient to effectively damage said cotton.

11. A process for selectively destroying grassy weeds in areas containing said weeds and cotton plants while not damaging said cotton plants which comprises applying to said areas and contacting said weeds and said cotton plants with a phytotoxic amount, with respect to said weeds, of a composition comprising a compound which is a member selected from the group consisting of methanearsonic acid, monoammonium methanearsonate and diammonium methanearsonate, said compound being applied in an amount sufficient to kill said weeds but not sufficient to effectively damage said cotton.

12. A process for selectively killing Johnson grass in an area containing cotton plants which comprises applying to said area and contacting said cotton plants and said Johnson grass with a phytotoxic amount of a composition comprising a compound which is a member selected from the group consisting of methanearsonic acid, monosodium methanearsonate, disodium methanearsonate and mixtures thereof sufficient to kill said Johnson grass but not sufficient to substantially damage said cotton.

13. The process of claim 12 wherein the compound is applied at a rate of about 1.57 to 3.78 lbs. per acre.

14. A process for selectively killing nut grass in an area containing cotton plants which comprises applying to said area and contact said cotton plants and said nut grass with a phytotoxic amount of a composition comprising a compound which is a member selected from the group consisting of methanearsonic acid, monosodium methanearsonate, disodium methanearsonate and mixtures thereof sufficient to kill said nut grass but not sufficient to substantially damage said cotton.

15. A process for selectively killing cocklebur in an area containing cotton plants which comprises applying to said area and contacting said cotton plants and said cocklebur with a phytotoxic amount of a composition comprising a compound which is a member selected from the group consisting of methanearsonic acid, monosodium methanearsonate, disodium methanearsonate and mixtures thereof sufficient to kill said cocklebur but not sufficient to substantially damage said cotton.

16. A process for selectively killing morning glory in an area containing cotton plants which comprises applying to said area and contacting said cotton plants and said morning glory with a phytotoxic amount of a composition comprising a compound which is a member selected from the group consisting of methanearsonic acid, monosodium methanearsonate, disodium methanearsonate and mixtures thereof sufficient to kill said morning glory but not sufficient to substantially damage said cotton.

References Cited

UNITED STATES PATENTS

| | | | |
|---|---|---|---|
| 2,678,265 | 5/1954 | Schwerdle | 71—2.7 |
| 2,709,648 | 5/1955 | Ryker | 71—2.6 |
| 2,889,347 | 6/1959 | Schwerdle | 260—442 |
| 3,056,668 | 10/1962 | Sprague | 71—2.7 X |
| 3,056,670 | 10/1962 | Stevens et al. | 71—2.7 |
| 3,056,821 | 10/1962 | Schwerdle | 71—2.7 X |

OTHER REFERENCES

Crafts: The Chemistry and Mode of Action of Herbicides, pages 207 to 210 (1961).

Gallagher et al.: Proceedings of Northeastern Weed Control Conference, Jan. 6, 1956; received Dept. of Agriculture, 1957, pp. 73 to 75.

Schwartz et al.: Surface Active Agents and Detergents, volume II, 1958, pages 655–56.

LEWIS GOTTS, *Primary Examiner.*

JAMES O. THOMAS, JR., *Examiner.*

A. J. ADAMCIK, *Assistant Examiner.*

Disclaimer 3,342,584.—*Robert C. Harnden*, Memphis, Tenn., and *John O. Moore*, West Helena, Ark. METHOD FOR KILLING BROADLEAF AND GRASSY WEEDS IN COTTON. Patent dated Sept. 19, 1967. Disclaimer filed Mar. 25, 1968, by the assignee, *The Ansul Company*.

Hereby enters this disclaimer to claims 1, 2, 3, 4, 6, 7, 8, 9, 10, 15 and 16 of said patent.

[*Official Gazette July 2, 1968.*]